United States Patent [19]

Dolan

[11] 4,359,262
[45] Nov. 16, 1982

[54] TRAY FOR ORGANIZING OPTICAL FIBER SPLICES AND ENCLOSURES EMBODYING SUCH TRAYS

[75] Inventor: Bruce I. Dolan, Nepean, Canada

[73] Assignee: Northern Telecom Limited, Montreal, Canada

[21] Appl. No.: 164,242

[22] Filed: Jun. 30, 1980

[51] Int. Cl.³ .............................................. G02B 7/26
[52] U.S. Cl. .............................. 350/96.20; 350/96.22
[58] Field of Search ............ 174/59; 350/96.20, 96.21, 350/96.22, 96.23; 211/49 R, 49 S, 126; 312/42, 50, 126, 127

[56] References Cited

U.S. PATENT DOCUMENTS

| | | | |
|---|---|---|---|
| 4,155,963 | 5/1979 | de Vecchis et al. | 350/96.23 X |
| 4,171,867 | 10/1979 | Cocito | 350/96.21 |
| 4,266,853 | 5/1981 | Hutchins et al. | 350/96.20 |
| 4,319,951 | 3/1982 | Korbelak et al. | 350/96.21 X |
| 4,332,435 | 6/1982 | Post | 350/96.20 |

FOREIGN PATENT DOCUMENTS

| | | | |
|---|---|---|---|
| 2363243 | 3/1978 | France | 350/96.21 |
| 2428850 | 1/1980 | France | 350/96.21 |
| 52-13346 | 2/1977 | Japan | 350/96.21 |
| 55-62414 | 5/1980 | Japan | 350/96.20 |
| 55-62415 | 5/1980 | Japan | 350/96.20 |

*Primary Examiner*—John D. Lee
*Attorney, Agent, or Firm*—Sidney T. Jelly

[57] ABSTRACT

An organizing tray for optical fiber splices has a plurality of grooves extending longitudinally, with resilient parts to retain packaged splices in the grooves. The tray snaps on to support tie members extending between end plates. Trays can be stacked one on another, with a top cover. Fibers are led from the cable ends into the trays via tubes. Excess fiber between cable ends and the splices is coiled in the tray and retained by a longitudinal strap. An enclosure will generally have a plurality of stacked trays, with an outer casing. Means can be provided for joining strength members in the cables. Copper conductors may also be included in the cables and are connected in the enclosure.

27 Claims, 12 Drawing Figures

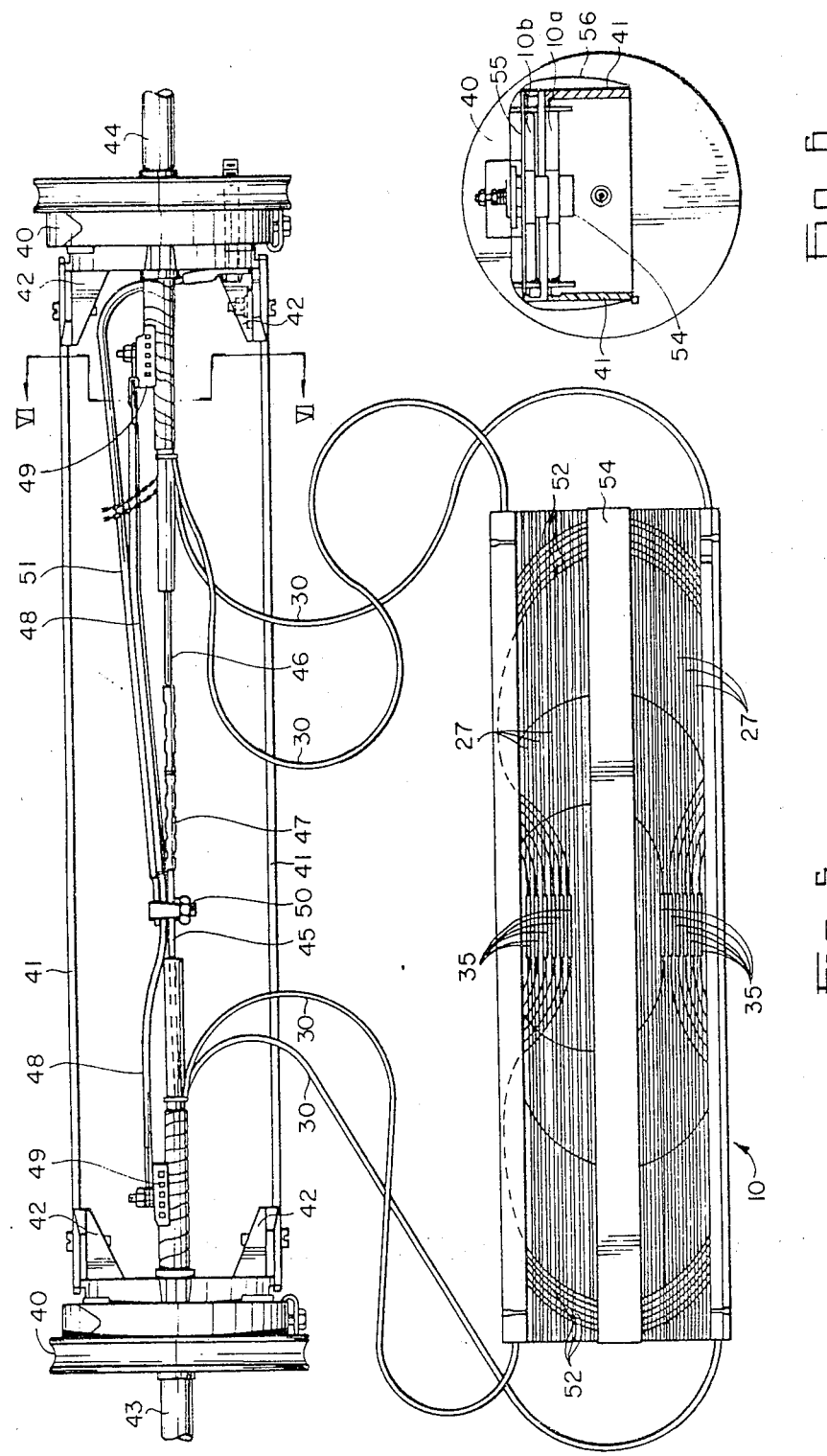

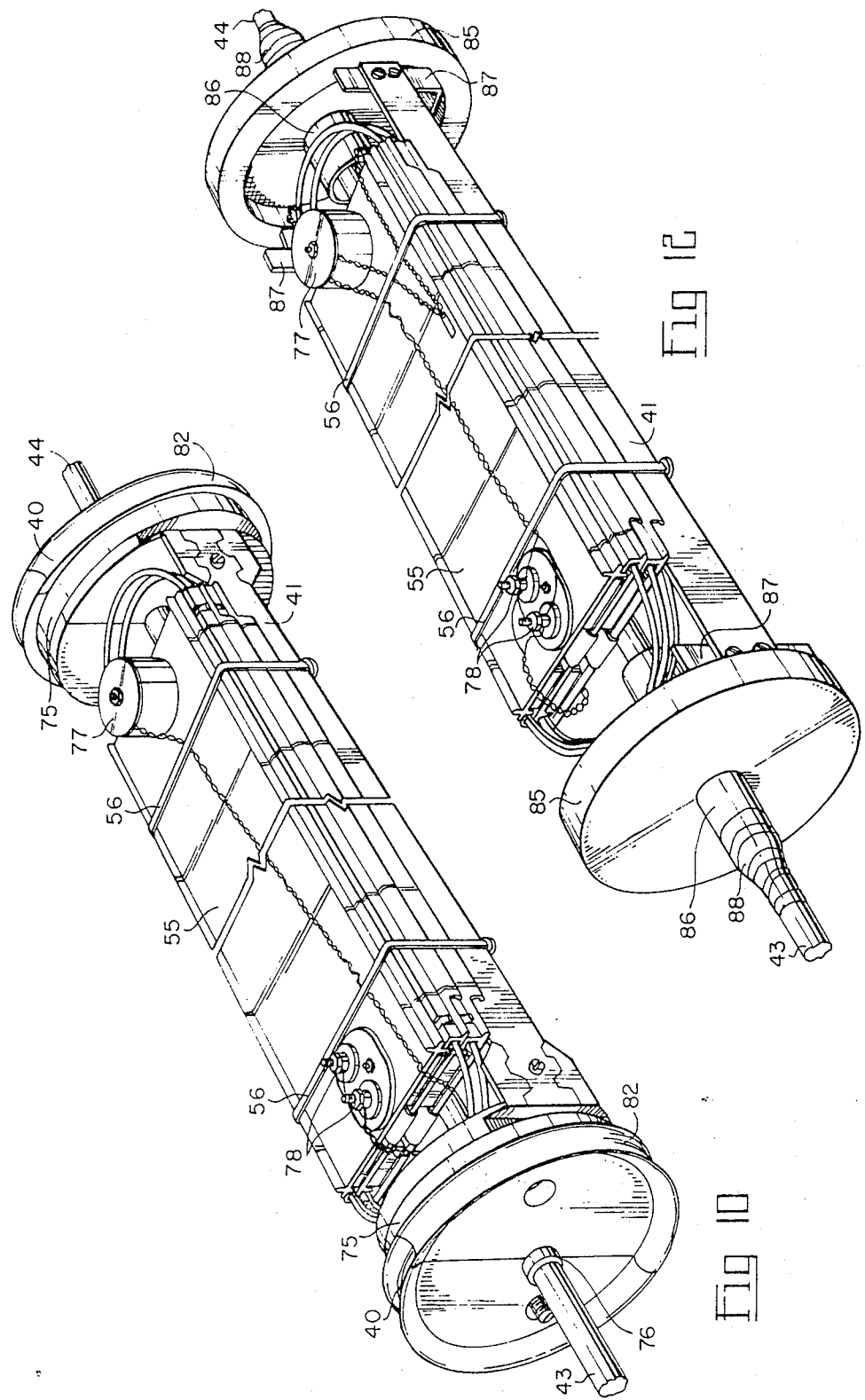

TRAY FOR ORGANIZING OPTICAL FIBER SPLICES AND ENCLOSURES EMBODYING SUCH TRAYS

This invention relates to trays for organizing of optical fiber splices and to enclosures embodying such trays.

Optical fibers, particularly when used for telecommunications and similar systems are made up into cables, a cable having a plurality of individual fibers. A cable may also include copper conductors and usually has a metal strength member extending longitudinally to prevent longitudinal stresses being applied to the fibers, when pulling a cable through a duct or suspending from a support wire for example. In a particular arrangement a plastic core having a plurality of helical grooves along its periphery carries one or more fibers in one or more grooves. Copper conductors may also be positioned in one or more grooves, and a metal wire strength member extends through the center of the core.

It becomes necessary to splice together the ends of cables and as the fibers are extremely fragile, care must be taken to arrange and protect the individual splices between fiber pairs.

The present invention provides a tray having a plurality of grooves into which individual packaged splices can be positioned, and held, the tray also having retaining means for holding plastic tubes within which fibers from a groove in the cable core pass from the cable to the tray, the tray also having space for a loop of fiber. Preferably, though not essentially, a retaining strap extends over the tray to retain the fiber lengths in position. The trays may be shaped to clip on to support means and trays may be stacked, clipping together. One or more trays may be assembled into an enclosure for use in overhead and/or underground installation and such an enclosure may comprise end plates, each with an aperture for passage of a fiber cable and sealing of the cable to the end plate, support means for the tray or trays and a cover over the top tray. Strapping means may be provided for holding the tray, or trays, and cover assembled.

Trays in accordance with the invention may vary in size and may be used for other purposes than in enclosures.

The invention will be readily understood by the following description of an embodiment, by way of example, in conjunction with the accompanying drawings, in which:

FIG. 5 is a plan view of an open enclosure and a tray, the tray displaced to one side, to show the cables and strength member;

FIG. 6 is a cross-section on the line VI—VI of FIG. 5, with two trays and a cover in position;

FIG. 10 is a perspective view of one form of an enclosure with trays and cover in place before the outside casing is applied;

FIG. 12 is a view similar to that of FIG. 10 of an alternative form of enclosure.

Figure 1:
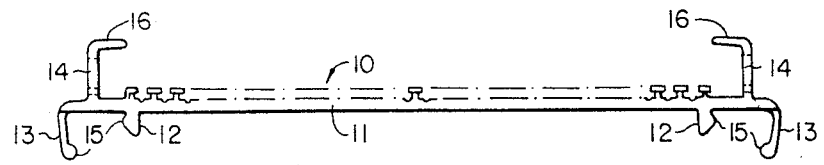
FIG. 1 is an end view of one form of tray or organizer.
Figure 2:
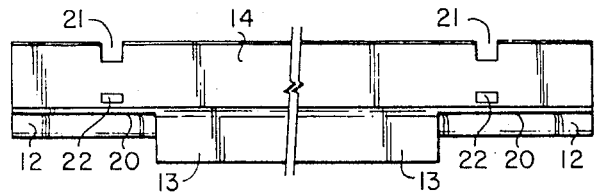
FIG. 2 is a side view of a tray as in FIG. 1, broken and shortened for convenience.
Figure 3:
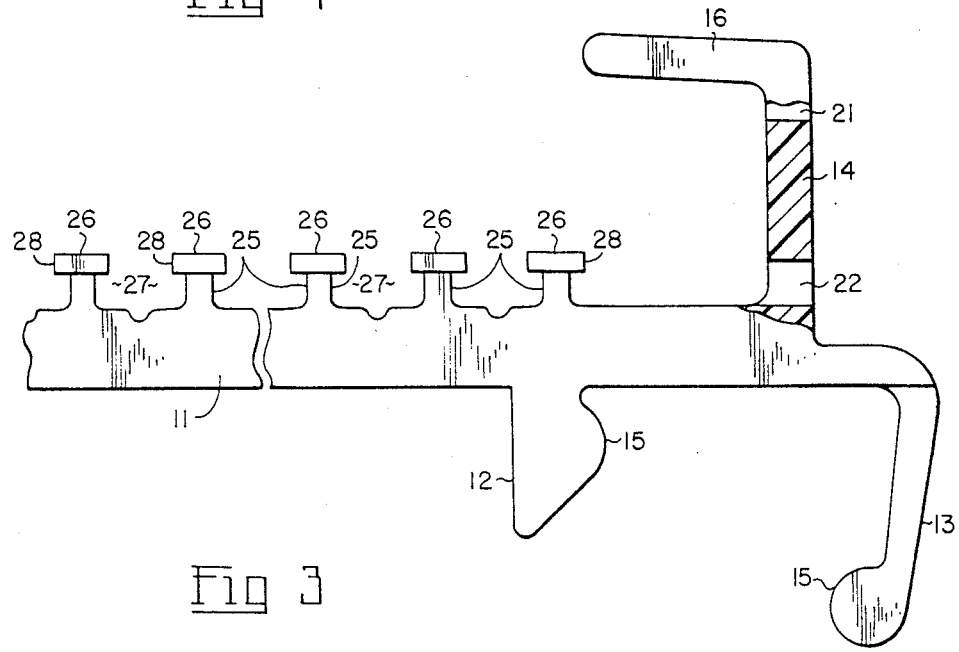
FIG. 3 is an enlarged end view of part of a tray illustrating the formation in more detail.

As seen in FIG. 1, and also FIGS. 2 and 3, a tray or organizer 10 is, in the example, made from a length of plastic extrusion. The tray has a central web 11, a pair of lower downward extending, ribs 12 and 13 along each side of the bottom surface and an upper upward extending, rib 14 near each edge of the top surface. The lower ribs 12 and 13 are shaped, with projections 15 facing toward each other, to locate over a support member. The upper ribs 14 have inward projecting flanges 16. The ribs 14 and flanges 16 are formed to interengage with ribs along each side of a cover, similar to the ribs, and the ribs 14 and flanges 16 will also fit in the formation of ribs 12 and 13 on the bottom of a further tray to provide for stacking.

The ribs 13 are removed for a short length at each end of the tray, at 20, in the present example to permit of mounting on support members of an enclosure. Also narrow grooves, or gaps 21, are cut in the ribs 14 and apertures 22 formed through the ribs 14, adjacent to each end of the tray for positioning of tie members, seen in FIG. 4.

FIG. 3 illustrates, to a larger scale, the form of the tray. A plurality of parallel ribs 25 extend along the tray. Conveniently the tray is extruded in a fairly rigid plastic material, for rigidity, strength and support. In a second stage extrusion, a cap 26 of a softer resilient material is extruded on to the top of each rib 25. There is thus formed a plurality of channels 27 with the edges 28 of the caps 26 forming resilient holding means for packaged splices.

Figure 4:
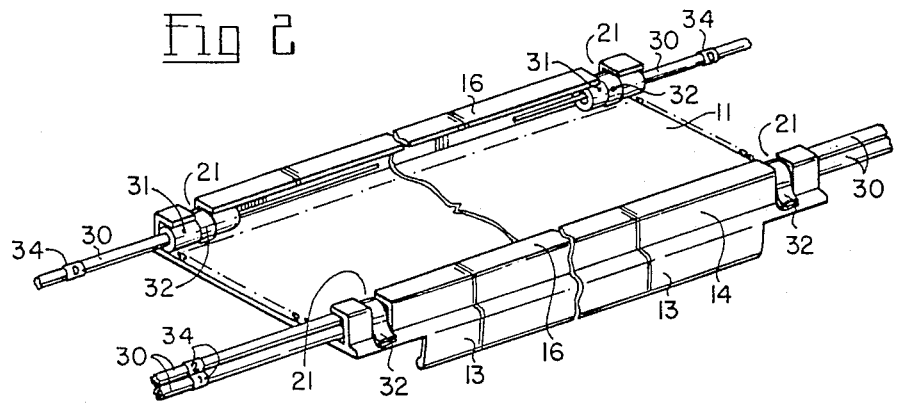
FIG. 4 is a perspective view of a tray and the plastic tubes through which the fibers pass to the tray from the cable.

As illustrated in FIG. 4, plastic tubes 30 enter at each end of the tray. A single tube may enter in the upper side of FIG. 4, or two tubes, as in the lower side of FIG. 4. Where one tube enters, a further tube 31 may be positioned round tube 30 before the tie of wrap 32 is applied. With two tubes no further tube is used, the tie 32 going round both tubes. Identification tags 34 can be applied to the tubes 30.

FIG. 5 illustrates a tray 10, with packaged optical fiber splices, indicated at 35, positioned in the grooves 27. Also illustrated is the support structure of an enclosure, comprising spaced apart end plates 40 connected by ties 41, the ties attached to the end plates by brackets 42. Each end plate has a central hole through which an optical fiber cable, 43 and 44, can pass. The cables are sealed in the holes. As previously stated, an optical fiber cable generally has a strength member and the strength members of each cable, indicated at 45 and 46, are joined via a tubular clamp 47.

The cables, which have a core with spiral grooves and with an outer layer of flexible waterproof material, have the outer layer removed at the ends to impose the core. The outer layer, and the core, are cut back a sufficient distance to provide a length of coated fiber which is long enough to provide for a coil of the fiber in the tray. The fibers from one groove are fed through a plastic tube 30, the fibers in each groove so arranged with the entry ends of the tubes positioned in the grooves. A tie is then positioned round the tubes and core to retain the tubes in position, and a layer of tape also wrapped around tubes and core. This will be seen more clearly in FIG. 8. With copper conductors sometimes present in one or more grooves, provision is made for connecting these also, but this is done in a conventional manner. A continuous earth connection can also be provided by a conductor 48 attached at each end to a clamp 49 on each cable and at the center of a clamp 50 on the strength member. An earth connection 51 is also made between clamp 50 and one of the brackets 42.

The tubes 30 enter the tray as illustrated in FIG. 4. The pairs of fibers, one from each cable, are spliced, for example fusion spliced, one method of which is described in application Ser. No. 48,669 filed June 14, 1979, (now U.S. Pat. No. 4,274,707) assigned to the present assignee. After splicing the splice is protected by packaging, for example in a package as described in application Ser. No. 81,204, filed Oct. 2, 1979, (now U.S. Pat. No. 4,254,865) assigned to the present assignee. The protective packages, each holding a splice between a pair of fibers, are positioned in the grooves 27 with a length of fiber coiled in the tray, as indicated at 52. This length of fiber permits a pair of fibers to be parted, by breaking out the splice and then one fiber respliced either to the same fiber or to another fiber.

The tray 10 rests on the ties 41. From the position shown in FIG. 5, the tray is first turned through 180°, that is the left hand end as in FIG. 5 will be at the right hand side when the tray is positioned on the ties. Thus the fibers in the tubes 30 loop through 180° from the end of the cable to the entry in the tray. Each splice can be provided with an identifying tube.

FIG. 6 illustrates two trays, 10a and 10b stacked on the ties 41, tray 10a directly on the ties and tray 10b on tray 10a. Each tray has a safety strap 54 which holds the fiber coils in place. Conveniently the strap is attached at each end to the under surface of the tray by hook and loop materials, such as are sold under the trademark Velcro. On top of the top tray is positioned a cover 55 and then retaining straps 56 passed round the assembly. This is seen in FIG. 10.

Figure 7:
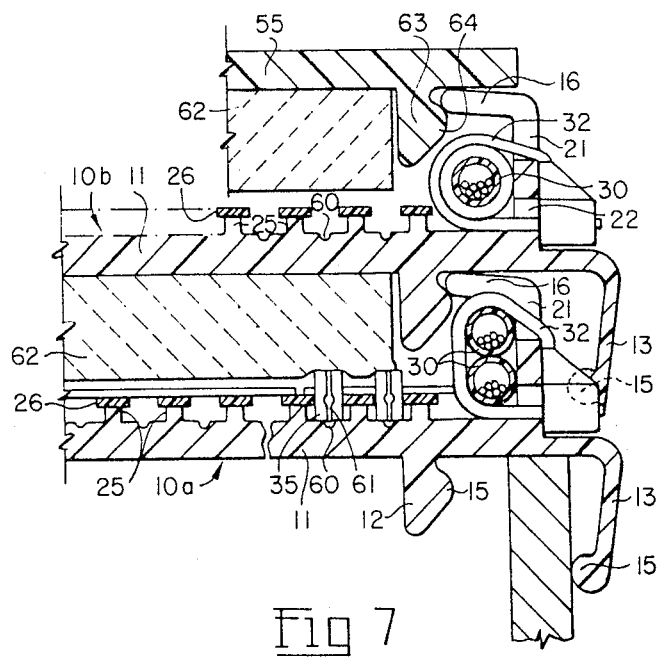
FIG. 7 is a cross-section through part of a support member, part of two trays and part of a cover on a line coincident with the gaps 21 and apertures 22.

FIG. 7 illustrates in more detail, for one side only, the assembly of two trays and a cover on a tie 41. The bottom tray 10a sits on tie 41, located by the rib 13 and projection 15. Two packaged splices 35 are shown pushed into grooves 27, deforming slightly the caps 26 on the ribs 25. Shallow grooves 60 are formed in the bottom of the grooves 27 to provide a clearance for any adhesive which may extend from the joint fuse 61 between the two halves of the package. A second tray 10b is positioned over tray 10a being located by rib 12 and projection 15 on the flange 16 of the bottom tray. A layer of foam material 62 is attached to the underside of the tray 10b and presses on the packaged splices 35. The cover 55 is positioned over the top tray being located by a rib 63 with a projection 64 of the same formation as rib 12 and projection 15 of a tray. Rib 63 locates on the flange 16 of the top tray, the cover snapping on, and there is also a layer of foam material 62 attached to the undersurface of the cover.

Figure 8:
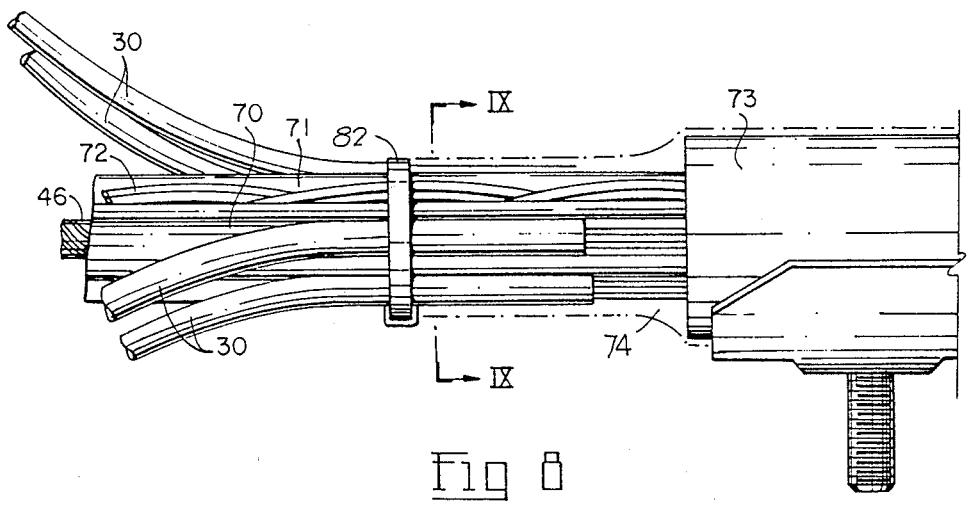
FIG. 8 is an enlarged view of the junction between the plastic tubes for the fibers and the cable core.
Figure 9:
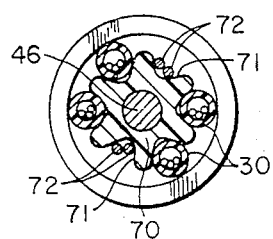
FIG. 9 is a cross-section on the line IX—IX of FIG. 8.

FIGS. 8 and 9 illustrate, in greater detail, being larger in scale than in FIG. 5, the termination of a cable in an enclosure and the leading of fibers from the cable. As previously explained there is a cover 70, of extruded plastic; with a wire center strength member 46. The core, in the present example, has six helical grooves 71 and, again in the present example, optical fibers are positioned in four of the grooves 71 while copper conductors 72 are positioned in the other two grooves. The core is encased in a coating layer 73. As seen in FIG. 8, the layer 73 is removed for a length from the end of the cable. Sufficient of the layer 73 is removed that some of the core and strength member can be cut off to leave lengths of the fibers free. A short length of the core is left uncovered and lengths of support tubes 30 are fed over the optical fibers. There can be one or several fibers in a groove and all the fibers from one groove are fed through the same support tube. The inlet end of each tube 30 is positioned in the related groove and a strap 82 passed round the tubes, and core, to retain the tubes in position. To seal the ends of the tubes, and the cable end, tape can be wrapped round the cable and core and tubes, as indicated by the dotted outline 74.

Figure 11:
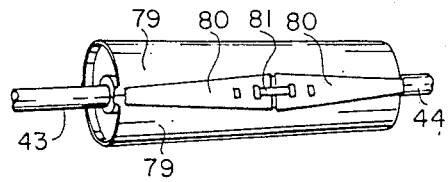
FIG. 11 is a perspective view of one form of a complete enclosure as in FIG. 10, with casing.

FIG. 10 illustrates an enclosure assembled, with the cables 43 and 44 passing through the end plates 40. For convenience the end plates are made in two halves which can be positioned around the cables and fastened together by a strap 75. The cable is wrapped with sealing tape, seen at 76, prior to positioning and fastening of the end plates, to provide a seal. The tie members 41 are attached to the end plates and two trays 10a and 10b are stacked on the ties plus a cover 55. Straps or ties 56 hold the trays and cover on to the ties. With copper conductors, a loading coil 77 can be mounted on the cover and also terminals 78 for use for grounding or other purposes. After assembly of end plates, ties, trays and cover, the enclosure is closed by an outer casing. In the example illustrated, and as seen in FIG. 11, two casing halves 79 are positioned over the end plates. Each casing half has each edge turned back, the turn back tapered, increasing to a maximum at the center. To hold the casing halves together tapered clamping members 80 are slid on from each end. The clamping members have turned under edges and interengage with the turned back edges of the casing halves. As the clamping members are pushed toward the center, towards each other, they force the sides of the halves together and the two clamping members on each side of the casing are held together by a clip 81. To ensure sealing, a sealing ring can be positioned in a peripheral groove 82 on each end plate.

FIG. 12 illustrates an assembled enclosure which is of a lead type. Solid end discs 85, of lead, are used, and lead tubes 86 pass through holes in the discs and are soldered thereto. The cables 43 and 44 are fed through the end discs prior to splicing. Brackets 87 are soldered to the discs 85 to carry the ties 41. After the splicing of the fibers and assembly of the trays to the enclosure, sealing tape is wrapped round the outer end of the lead tubes 86 and on to the cable 43 and 44, as shown at 88. The enclosure is completed by soldering of a lead sleeve on to the end discs 85.

While the invention has been described generally with use in an enclosure, trays or organizers as described can be used in other arrangements where it is desired to support splices in an organized manner. The length of the tray can vary depending upon particular use. Also cables of other forms than cylindrical can be used. For example flat cables can be connected, the fibers being carried in a foam member having a plurality of Vee or U shaped grooves. The support tubes can be positioned in the grooves in the same manner as a cylindrical cable.

Instead of the tray being formed by a double extrusion method, forming first the central web 11 and ribs 25 and then adding the caps 26, a tray can be formed only with the central web 11 and a foam rubber or plastic member attached to the web, as by bonding, the foam member having formed therein parallel grooves to hold the packaged splices. The foam member can be formed as a separate extrusion and lengths cut off and attached to the trays. It is possible in such an arrangement, to provide the package holding grooves or channels for only the central portion of a tray, that is it need not extend the whole length of a tray. Also, although the trays have been illustrated with the grooves in the upper surface, it will be appreciated that once the enclosure is assembled, rotation of the enclosure about its axis, as may occur in service, will not affect the mounting of the trays or of the splices in the trays.

What is claimed is:

1. A tray for organizing optical fiber splices, comprising:
   a central web;
   a plurality of grooves extending longitudinally on an upper surface of the web, said grooves including resilient means for holding packaged splices;
   means extending from a lower surface of the web for mounting of a tray on a support;
   means extending from the upper surface of the web for positioning a cover over the web and packaged splices.

2. A tray as claimed in claim 1, said means extending from a lower surface of the web comprising a downward extending rib at each side of the web and an inward projection extending along the bottom edge of each rib.

3. A tray as claimed in claim 2, said means extending from the upper surface of the web comprising an upward extending rib at each side of the web and a flange extending inward from an upper edge of each rib.

4. A tray as claimed in claim 3, including a further rib extending downward from said lower surface, spaced inwardly from and parallel to each of said downward extending ribs, and an outwardly extending projection extending along a bottom edge of each further rib, said further ribs and projections adapted to snap between inner edges of said flanges extending inward from the upper edges of the ribs extending upward from the web.

5. A tray as claimed in claim 3, said upwardly extending ribs and inwardly extending flanges defining, with said web, a channel along each side of a tray.

6. A tray as claimed in claim 5, said channels adapted to receive plastic tubes at each end, said tubes each containing at least one optical fiber, and retaining means at each end of each channel for retaining said tubes in said channels.

7. A tray as claimed in claim 1, including a strap extending longitudinally to retain optical fiber lengths in the tray.

8. A tray as claimed in claim 1, said grooves defined by parallel ribs integral with said web, and a cap of resilient material attached to a top surface of each rib, the cap extending laterally to each side of the rib.

9. A tray as claimed in claim 1, said grooves defined by parallel ribs integral with a layer of resilient material attached to said web.

10. A tray as claimed in claim 1, formed from a length of extruded plastics material.

11. An enclosure for optical fiber cable splices, comprising:
    two spaced apart end plates, each plate including an aperture for entry of an optical fiber cable therethrough;
    a pair of spaced tie members connecting said end plates;
    an elongate tray supported on said tie members, the tray having a central web and a plurality of grooves extending longitudinally on an upper surface of the web, the grooves including resilient means for holding packaged splices;
    the tray including means extending from a lower surface of the web for engaging with said tie members to locate and support said tray on said tie members and means extending from an upper surface of the web for positioning a cover over the web and packaged splices.

12. An enclosure as claimed in claim 11, including a further tray mounted and supported on said tray, said further tray including means extending from a lower surface of the web for interengagement with said means extending from the upper surface of the web of said tray, whereby said further tray acts as a cover for said tray, said tray and said further tray being of the same form.

13. An enclosure as claimed in claim 12, including a layer of resilient material attached to the lower surface of the web of the further tray, to retain packaged splices in the grooves in said tray.

14. An enclosure as claimed in claim 11, an optical fiber cable end extending through each end plate, each cable including a core having a plurality of grooves, at least one optical fiber in each of at least some of the grooves, a plastic tube extending from each groove containing an optical fiber, each tube having one end located and retained in a groove and the other end located and retained in one end of a tray, the tubes from one cable end located at one end of a tray and tubes from the other cable located at the other end of the tray.

15. An enclosure as claimed in claim 14, said means extending from an upper surface of the web comprising an upwardly extending rib at each side of the web and a flange extending inward from an upper edge of each rib, said upwardly extending ribs and inwardly extending flanges defining, with said web, a channel along each side of a tray, said tubes having said other ends located and retained in the channels.

16. An enclosure as claimed in claim 14, including a plurality of said trays mounted one above another, tubes from one cable extending from the core to one end of each of said trays and tubes from the other cable extending from the core to the other end of each of said trays.

17. An enclosure as claimed in claim 16, a cover attached to the top tray, and at least one restraining member passing round said tie members, said trays and said cover.

18. An enclosure as claimed in claim 16, including an outer casing connected to the end plates and enclosing said trays.

19. An enclosure as claimed in claim 18, said end plate formed of two halves butted about the related cable and a strap around each end plate retaining the two halves in butted relationship.

20. An enclosure as claimed in claim 19, including a wrapping of sealing tape around each cable end, the end plates engaged with the cable ends at said sealing tape.

21. An enclosure as claimed in claim 18, said casing comprising two halves of semi-cylindrical form, said halves clamped together along each side.

22. An enclosure as claimed in claim 18, each end plate comprising a lead plate, a lead tube over each cable end and passing through said aperture in each end plate, said tubes soldered to said end plates, said casing comprising a lead sleeve extending between the end plates and soldered thereto.

23. An enclosure as claimed in claim 16, a packaged optical fiber splice positioned in each of at least some of the grooves on each tray, and a coil of optical fiber extending from each side of each splice, the fiber on one side of a splice extending from one cable and the fiber on the other side of a splice extending from the other cable, the coils of fiber stored in the related tray, and a retaining strap extending longitudinally of each tray to retain the coils of fiber in the trays.

24. An enclosure as claimed in claim 14, said optical fiber cables including a central strength member, including means connecting said strength members of the two cables.

25. An enclosure as claimed in claim 14, each said optical fiber cable including at least one metal conductor in at least one of said grooves in said core, and means connecting the metal conductors.

26. An enclosure as claimed in claim 25, including a loading coil mounted on said cover, said loading coil connected to said metal conductors.

27. An enclosure as claimed in claim 14, a packaged optical fiber splice positioned in each of at least some of the grooves on the tray, and a coil of optical fiber extending from each side of each splice, the fiber on one side of a splice extending from one cable and the fiber on the other side of a splice extending from the other cable, the coils of fiber stored in the trays, and a retaining strap extending longitudinally of the tray to retain the coils of fiber in the tray.

* * * * *